(12) United States Patent
Nagahara

(10) Patent No.: US 11,347,446 B2
(45) Date of Patent: May 31, 2022

(54) PRINTING APPARATUS, PRINTING MEDIUM DETERMINATION METHOD AND PATCH SELECTION METHOD

(71) Applicant: SEIKO EPSON CORPORATION, Tokyo (JP)

(72) Inventor: Atsushi Nagahara, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/209,882

(22) Filed: Mar. 23, 2021

(65) Prior Publication Data
US 2021/0303231 A1    Sep. 30, 2021

(30) Foreign Application Priority Data

Mar. 26, 2020 (JP) .............................. JP2020-056696

(51) Int. Cl.
*G06F 3/12* (2006.01)
*G06K 15/02* (2006.01)
*H04N 1/60* (2006.01)

(52) U.S. Cl.
CPC .......... *G06F 3/1208* (2013.01); *G06F 3/1218* (2013.01); *G06F 3/1237* (2013.01); *G06K 15/027* (2013.01); *G06K 15/1878* (2013.01); *H04N 1/6097* (2013.01)

(58) Field of Classification Search
None
See application file for complete search history.

(56) References Cited

U.S. PATENT DOCUMENTS

| | | | |
|---|---|---|---|
| 2009/0231621 A1 | 9/2009 | Kuwahara | |
| 2016/0080611 A1* | 3/2016 | Yorimoto | G01J 3/0262 358/509 |
| 2017/0126933 A1* | 5/2017 | Kanai | H04N 1/00023 |
| 2019/0294935 A1* | 9/2019 | Iwanami | H04N 1/4076 |
| 2021/0329146 A1* | 10/2021 | Matsuo | H04N 1/00087 |

FOREIGN PATENT DOCUMENTS

| | | |
|---|---|---|
| JP | 2009-220290 A | 10/2009 |
| JP | 2016-190707 A | 11/2016 |

* cited by examiner

*Primary Examiner* — Miya J Williams
(74) *Attorney, Agent, or Firm* — Workman Nydegger

(57) ABSTRACT

A printing unit configured to apply a color material to a printing medium to perform printing, a colorimetric unit configured to perform colorimetry, a storage unit configured to store patch data defining a color of a color patch for a plurality of the color patches, and a control unit are included, wherein the control unit uses patch data for one color patch of the plurality of color patches stored in the storage unit, to cause the printing unit to print the color patch on the printing medium, and determines whether a type of the printing medium on which the printing unit printed the color patch is a predetermined type, based on a colorimetric value obtained by the colorimetry performed by the colorimetric unit on the color patch printed by the printing unit.

8 Claims, 13 Drawing Sheets

FIG. 5A

| Lab | SPECIFIC COLOR PATCH P1 | SPECIFIC COLOR PATCH P2 | SPECIFIC COLOR PATCH P3 | SPECIFIC COLOR PATCH P4 | SPECIFIC COLOR PATCH P5 |
|---|---|---|---|---|---|
| | 56, 66, 36 | 47, -2, -43 | 59, -55, 26 | 32, 14, -15 | 93, -11, 74 |
| MEDIUM TYPE α | 1, 84, 71, 0 | 82, 45, 3, 0 | 79, 3, 92, 0 | 64, 79, 38, 13 | 8, 2, 79, 0 |
| MEDIUM TYPE β | 5, 100, 78, 0 | 95, 61, 6, 0 | 95, 13, 100, 0 | 67, 96, 38, 23 | 8, 0, 79, 0 |
| MEDIUM TYPE γ | 0, 83, 56, 0 | 83, 50, 0, 0 | 84, 3, 88, 0 | 67, 73, 26, 20 | 8, 0, 76, 0 |

FIG. 5B

| Lab | SPECIFIC COLOR PATCH P1 | SPECIFIC COLOR PATCH P2 | SPECIFIC COLOR PATCH P3 | SPECIFIC COLOR PATCH P4 | SPECIFIC COLOR PATCH P5 | SELECTED PATCH |
|---|---|---|---|---|---|---|
| | 56, 66, 36 | 47, -2, -43 | 59, -55, 26 | 32, 14, -15 | 93, -11, 74 | |
| MEDIUM TYPE α | 1, 84, 71, 0 | 82, 45, 3, 0 | 79, 3, 92, 0 | 64, 79, 38, 13 | 8, 2, 79, 0 | SPECIFIC COLOR PATCH P1 |
| MEDIUM TYPE β | 5, 100, 78, 0 | 95, 61, 6, 0 | 95, 13, 100, 0 | 67, 96, 38, 23 | 8, 0, 79, 0 | SPECIFIC COLOR PATCH P5 |
| MEDIUM TYPE γ | 0, 83, 56, 0 | 83, 50, 0, 0 | 84, 3, 88, 0 | 67, 73, 26, 20 | 8, 0, 76, 0 | SPECIFIC COLOR PATCH P1 |

60P1

| REFERENCE TYPE | COLOR DIFFERENCE FROM COMPARISON TYPE | | |
|---|---|---|---|
| | MEDIUM TYPE α | MEDIUM TYPE β | MEDIUM TYPE γ |
| MEDIUM TYPE α | 0 | 3.3 | 3.4 |
| MEDIUM TYPE β | 3.8 | 0 | 1.6 |
| MEDIUM TYPE γ | 3.6 | 3.7 | 0 |

60P2

| REFERENCE TYPE | COLOR DIFFERENCE FROM COMPARISON TYPE | | |
|---|---|---|---|
| | MEDIUM TYPE α | MEDIUM TYPE β | MEDIUM TYPE γ |
| MEDIUM TYPE α | 0 | 1.1 | 1.3 |
| MEDIUM TYPE β | 1.2 | 0 | 0.8 |
| MEDIUM TYPE γ | 1.4 | 0.9 | 0 |

60P3

| REFERENCE TYPE | COLOR DIFFERENCE FROM COMPARISON TYPE | | |
|---|---|---|---|
| | MEDIUM TYPE α | MEDIUM TYPE β | MEDIUM TYPE γ |
| MEDIUM TYPE α | 0 | 2.0 | 2.2 |
| MEDIUM TYPE β | 1.9 | 0 | 1.8 |
| MEDIUM TYPE γ | 2.3 | 1.9 | 0 |

60P4

| REFERENCE TYPE | COLOR DIFFERENCE FROM COMPARISON TYPE | | |
|---|---|---|---|
| | MEDIUM TYPE α | MEDIUM TYPE β | MEDIUM TYPE γ |
| MEDIUM TYPE α | 0 | 2.0 | 3.0 |
| MEDIUM TYPE β | 1.8 | 0 | 3.0 |
| MEDIUM TYPE γ | 3.1 | 2.9 | 0 |

60P5

| REFERENCE TYPE | COLOR DIFFERENCE FROM COMPARISON TYPE | | |
|---|---|---|---|
| | MEDIUM TYPE α | MEDIUM TYPE β | MEDIUM TYPE γ |
| MEDIUM TYPE α | 0 | 3.5 | 1.3 |
| MEDIUM TYPE β | 3.3 | 0 | 3.2 |
| MEDIUM TYPE γ | 1.1 | 3.3 | 0 |

| SPECIFIC COLOR PATCH | COLOR DIFFERENCE FROM COMPARISON TYPE | |
|---|---|---|
| | MEDIUM TYPE β | MEDIUM TYPE γ |
| SPECIFIC COLOR PATCH P1 | 3.3 | 3.4 |
| SPECIFIC COLOR PATCH P2 | 1.1 | 1.3 |
| SPECIFIC COLOR PATCH P3 | 2.0 | 2.2 |
| SPECIFIC COLOR PATCH P4 | 2.0 | 3.0 |
| SPECIFIC COLOR PATCH P5 | 3.5 | 1.3 |

60β

| REFERENCE TYPE | COLOR DIFFERENCE FROM COMPARISON TYPE | |
|---|---|---|
| | MEDIUM TYPE α | MEDIUM TYPE γ |
| SPECIFIC COLOR PATCH P1 | 3.8 | 1.6 |
| SPECIFIC COLOR PATCH P2 | 1.2 | 0.8 |
| SPECIFIC COLOR PATCH P3 | 1.9 | 1.8 |
| SPECIFIC COLOR PATCH P4 | 1.8 | 3.0 |
| SPECIFIC COLOR PATCH P5 | 3.3 | 3.2 |

60γ

| REFERENCE TYPE | COLOR DIFFERENCE FROM COMPARISON TYPE | |
|---|---|---|
| | MEDIUM TYPE α | MEDIUM TYPE β |
| SPECIFIC COLOR PATCH P1 | 3.6 | 3.7 |
| SPECIFIC COLOR PATCH P2 | 1.4 | 0.9 |
| SPECIFIC COLOR PATCH P3 | 2.3 | 1.9 |
| SPECIFIC COLOR PATCH P4 | 3.1 | 2.9 |
| SPECIFIC COLOR PATCH P5 | 1.1 | 3.3 |

| | SPECIFIC COLOR PATCH P1 | SPECIFIC COLOR PATCH P2 | SPECIFIC COLOR PATCH P3 | SPECIFIC COLOR PATCH P4 | SPECIFIC COLOR PATCH P5 |
|---|---|---|---|---|---|
| Lab | 56, 66, 36 | 47, -2, -43 | 59, -55, 26 | 32, 14, -15 | 93, -11, 74 |
| MEDIUM TYPE α | 1, 80, 70, 0 | 80, 45, 4, 0 | 79, 3, 90, 0 | 63, 79, 39, 13 | 8, 2, 80, 0 |
| MEDIUM TYPE β | 5, 100, 78, 0 | 95, 61, 6, 0 | 95, 13, 100, 0 | 67, 96, 38, 23 | 8, 0, 79, 0 |
| MEDIUM TYPE γ | 0, 83, 56, 0 | 83, 50, 0, 0 | 84, 3, 88, 0 | 67, 73, 26, 20 | 8, 0, 76, 0 |

FIG. 12

PRINTING APPARATUS, PRINTING MEDIUM DETERMINATION METHOD AND PATCH SELECTION METHOD

The present application is based on, and claims priority from JP Application Serial Number 2020-056696, filed Mar. 26, 2020, the disclosure of which is hereby incorporated by reference herein in its entirety.

BACKGROUND

1. Technical Field

The present disclosure relates to a printing apparatus, a printing medium determination method, and a patch selection method.

2. Related Art

An image forming device is disclosed that detects a paper type of a sheet to be transported, based on a detection result of a medium sensor provided in advance at a transport path of the sheet, and a paper type detection table provided in advance (see JP 2016-190707 A).

Further, a configuration is disclosed in which a colorimetric apparatus is provided at a downstream position in a transport direction from a carriage that holds a recording head in a printer, and the colorimetric apparatus measures a colorimetric pattern recorded on roll paper to obtain a correction value for color calibration (see JP 2009-220290 A).

According to JP 2016-190707 A, a dedicated medium sensor is required to be provided in the device in order to detect the paper type of the sheet, and therefore a cost of the device is increased. Therefore, improvements have been demanded to appropriately make determination of the printing medium while keeping the cost down as much as possible.

SUMMARY

A printing apparatus includes a printing unit configured to apply a color material to a printing medium to perform printing, a colorimetric unit configured to perform colorimetry, a storage unit configured to store patch data defining a color of a color patch for a plurality of the color patches, and a control unit, wherein the control unit uses patch data for one color patch of the plurality of color patches stored in the storage unit, to cause the printing unit to print the color patch on the printing medium, and determines whether a type of the printing medium on which the printing unit printed the color patch is a predetermined type, based on a colorimetric value obtained by the colorimetry performed by the colorimetric unit on the color patch printed by the printing unit.

A printing medium determination method includes a patch acquisition step for acquiring patch data of one color patch from a storage unit storing patch data defining a color of a color patch for a plurality of the color patches, a printing step for using the patch data of the one color patch to cause a printing unit, configured to apply a color material to a printing medium for performing printing, to print the color patch on the printing medium, and a determination step for determining whether a type of the printing medium on which the printing unit printed the color patch is a predetermined type, based on a colorimetric value obtained by colorimetry performed by a colorimetric unit on the color patch printed by the printing unit.

A patch selection method includes an acquisition step for acquiring a reference value indicating a color of a color patch in a predetermined color space, and color material data defining an amount of a color material for reproducing the reference value on a printing medium of a reference type, and a difference calculating step for calculating a difference between each colorimetric value obtained when the color material data is used to perform printing on each printing medium of a comparison type different from the reference type and the reference value, wherein the acquisition step and the differential calculating step are repeatedly performed with a combination of the color patch and the reference type changed, and the method includes, after the acquisition step and the difference calculating step are repeatedly performed, a selection step for selecting, based on the calculated difference, a color patch for each type of the printing medium as the reference type for discriminating the printing medium as the reference type from the printing medium of the comparison type.

BRIEF DESCRIPTION OF THE DRAWINGS

FIG. 5A is a diagram illustrating an example of a specific color dB, and FIG. 5B is a diagram illustrating an example of a specific color DB with which a selection result of a specific color patch for each medium type is registered.

FIG. 7 is a diagram illustrating an example of difference table data.

FIG. 8 is a diagram illustrating the difference table data in FIG. 7 in another form of expression.

FIG. 12 is a diagram illustrating an example of a specific color DB with part of information updated.

DESCRIPTION OF EXEMPLARY EMBODIMENTS

An exemplary embodiment of the present disclosure will be described below with reference to the accompanying drawings. Note that, each of the drawings is merely illustrative for describing the present exemplary embodiment. Because each drawing is exemplary, proportions and shapes may not be precise, match each other, or a part may be omitted.

1. Apparatus Configuration

Figure 1:
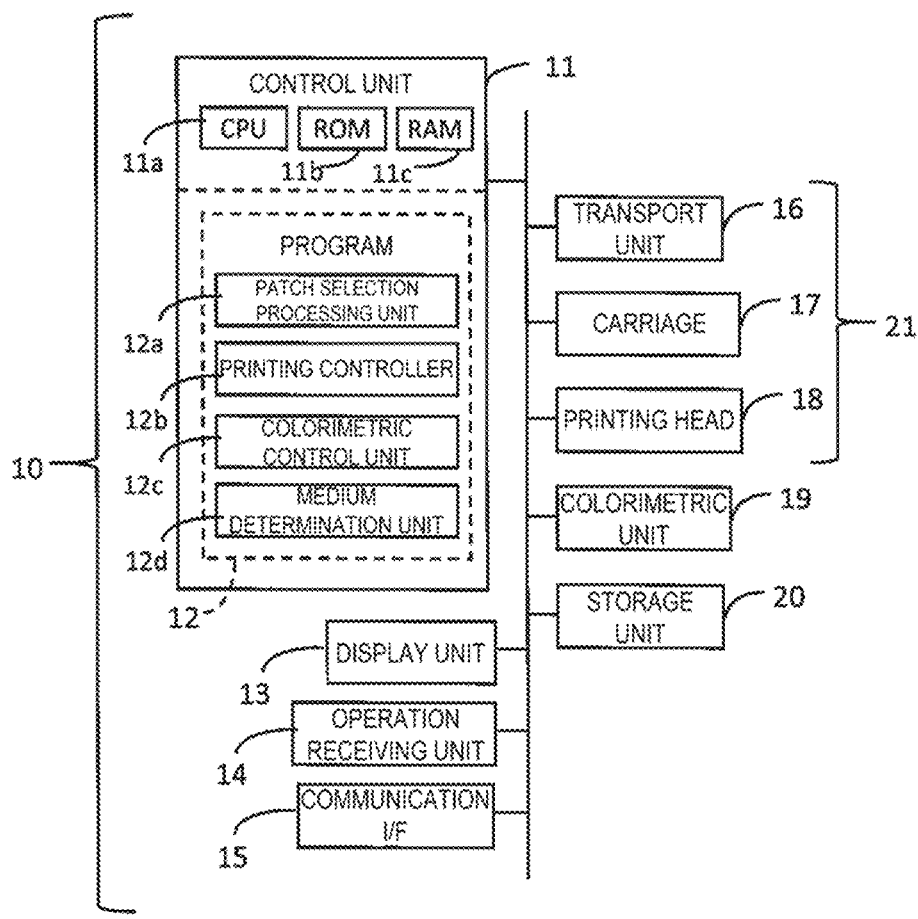
FIG. 1 is a block diagram simply illustrating an apparatus configuration.

FIG. 1 simply illustrates a configuration of a printing apparatus 10 according to the present exemplary embodiment.

The printing apparatus 10 includes a control unit 11, a display unit 13, an operation receiving unit 14, a communication I/F 15, a transport unit 16, a carriage 17, a printing head 18, a colorimetric unit 19, a storage unit 20, and the like. I/F is an abbreviation for interface. The control unit 11 is configured to include one or more ICs each having a CPU 11a as a processor, a ROM 11b, a RAM 11c, and the like, other non-volatile memories, and the like.

In the control unit 11, the processor or the CPU 11a executes arithmetic processing according to one or more programs 12 stored in the ROM 11b, other memories, and the like, using the RAM 11c or the like as a work area, to achieve various functions such as a patch selection processing unit 12a, a printing controller 12b, a colorimetric control unit 12c, a medium determination unit 12d, and the like. Note that, the processor is not limited to a single CPU, and may be configured to perform processing by a plurality of CPUs, or a hardware circuit such as an ASIC, or the like, or configured such that a CPU and a hardware circuit cooperate to perform processing.

The display unit 13 is a means for displaying visual information, and is configured, for example, by a liquid crystal display, an organic EL display, or the like. The display unit 13 may be configured to include a display and a drive circuit for driving the display. The operation receiving unit 14 is a means for receiving an operation by a user, and is realized by, for example, a physical button, a touch panel, a mouse, a keyboard, or the like. Of course, the touch panel may be realized as a function of the display unit 13.

The display unit 13 and the operation receiving unit 14 may be part of the configuration of the printing apparatus 10, but may be a peripheral device externally attached to the printing apparatus 10. The communication I/F 15 is a generic term for one or more I/Fs for the printing apparatus 10 to couple to an outside in a wired or wireless manner according to a predetermined communication protocol including a known communication standard.

The transport unit 16 is a means for transporting a printing medium, and includes a roller, a motor for rotating the roller, or the like. The printing head 18 discharges ink onto a printing medium using an ink-jet method to perform printing. The colorimetric unit 19 is a means for measuring a color of a target. A format of colorimetric value generated and outputted as a colorimetric result by the colorimetric unit 19 is, for example, an L*a*b* value according to an L*a*b* color space defined by CIE (International Commission on Illumination) or an RGB value obtained by combining respective gray scale values of red (R), green (G), and blue (B).

Figure 2:
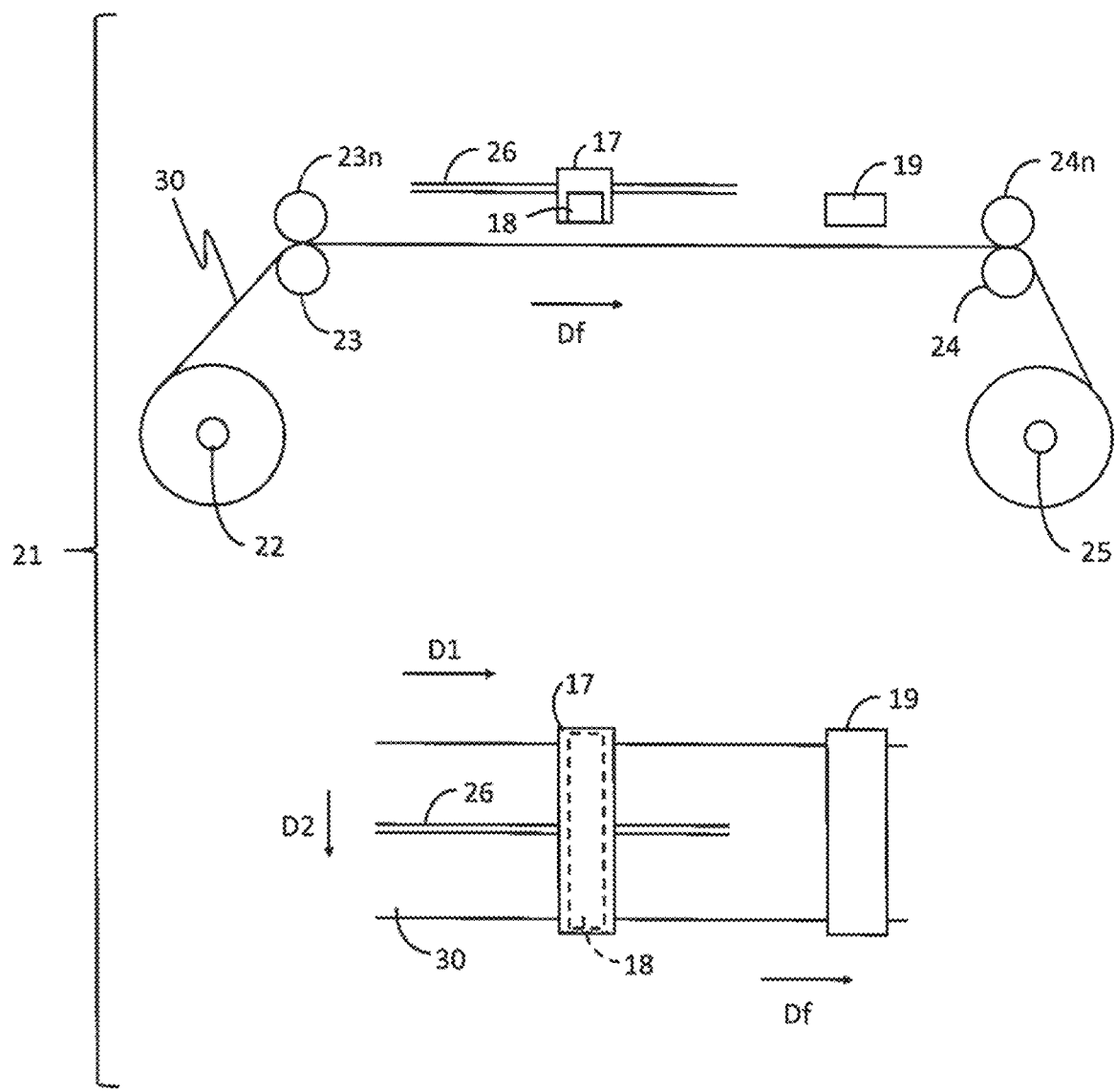
FIG. 2 is a diagram illustrating a specific example of a configuration mainly corresponding to a printing unit.

The carriage 17 is a mechanism capable of reciprocating along a first direction by receiving power by a carriage motor (not illustrated). The first direction is also referred to as a main scanning direction. As illustrated in FIG. 2, the carriage 17 includes the printing head 18. The configuration including the transport unit 16, the carriage 17, and the printing head 18 is collectively referred to as a printing unit 21. It is sufficient that the printing unit 21 is a means capable of performing printing by applying a color material to a printing medium. The color material is ink or toner. In addition to employing the ink-jet method, the printing unit 21 may implement printing using, for example, an electrophotographic method or a thermal method. Furthermore, in the present exemplary embodiment, the example of the printing head of a serial type that moves along with movement of the carriage 17 is described as the printing head 18, but a line type printing head that does not involve movement of a printing head during ink discharge may be used. The storage unit 20 is realized by a non-volatile memory, an HDD, or other storage devices. The storage unit 20 may be interpreted as a part of the control unit 11, or the RAM 11c may be interpreted as a part of the storage unit 20, for example.

The configuration of the printing apparatus 10 illustrated in FIG. 1 may be realized by a single printer, or may be realized by a plurality of devices communicatively coupled.

In other words, the printing apparatus 10 may be a printing system 10 as a matter of reality. The printing system 10 includes, for example, an information processing device that functions as the control unit 11, the storage unit 20, and a printer including the printing unit 21 and the colorimetric unit 19. The printing apparatus 10 or the printing system 10 achieves a printing medium determination method and a patch selection method according to the present exemplary embodiment.

FIG. 2 illustrates a specific example of a part of the printing apparatus 10, mainly the printing unit 21. The specific example is illustrated in an upper stage in FIG. 2 by a perspective orthogonal to a transport direction Df of a printing medium 30. Furthermore, a portion of the specific example is illustrated in a bottom stage in FIG. 2 by a perspective from above.

The transport unit 16 includes a feeding shaft 22 upstream of transport, and a winding shaft 25 downstream of the transport. Upstream and downstream of the transport are simply designated upstream and downstream. An elongated printing medium 30 wound in a roll shape around the feeding shaft 22 and the winding shaft 25 is tensioned along the transport direction Df. The printing medium 30 is transported in the transport direction Df. The printing medium 30 may be a sheet or may be a medium made from a material other than paper.

In the example in the upper stage in FIG. 2, the feeding shaft 22 is rotated in a clockwise direction so that the printing medium 30 wound around the feeding shaft 22 is fed downstream. A front driving roller 23 is provided at a downstream position of the feeding shaft 22, and a rear driving roller 24 is provided at an upstream position of the winding shaft 25. By rotating in the clockwise direction, the front driving roller 23 transports the printing medium 30 fed from a feeding portion 22 downstream. A nip roller 23n is provided with respect to the front driving roller 23. The nip roller 23n comes into contact with the printing medium 30 so as to sandwich the printing medium 30 together with the front driving roller 23.

The rear driving roller 24 transports the printing medium 30 transported downstream by the front driving roller 23 further downstream by rotating in the clockwise direction. A nip roller 24n is provided with respect to the rear driving roller 24. The nip roller 24n comes into contact with the printing medium 30 so as to sandwich the printing medium 30 together with the rear driving roller 24.

The printing head 18 that discharges ink to the printing medium 30 from above is disposed between the front driving roller 23 and the rear driving roller 24. As illustrated in FIG. 2, the printing head 18 is mounted on the carriage 17. The printing head 18 is capable of discharging ink of a plurality of colors such as cyan (C), magenta (m), yellow (Y), and black (K). Although omitted from the illustration, the printing head 18 has a nozzle row for each of inks of CMYK. A nozzle row corresponding to one color ink is constituted by a plurality of nozzles discharging the one color ink, that is a plurality of nozzles in which a nozzle-to-nozzle distance (nozzle pitch) in a second direction D2 is constant.

Each nozzle included in the printing head 18 is open to a facing surface facing the printing medium 30 of the printing head 18, and the printing head 18 does or does not discharge ink from the nozzle based on print data. The ink discharged by the nozzle is referred to as an ink droplet or referred to as a dot. The printing head 18 may be referred to as a print head, an inkjet head, a liquid discharging head, and the like.

Rotation of the winding shaft 25 in the clockwise direction causes the printing medium 30 after printing transported by the rear driving roller 24 to be wound around the winding shaft 25.

The feeding shaft 22, the winding shaft 25, each roller, a motor (not illustrated) for appropriately rotating the these, and the like, is a specific example of the transport unit 16 that transports the printing medium 30. The number and arrangement of rollers provided in the middle of a transport path for transporting the printing medium 30 is not limited to the aspect illustrated in FIG. 2. Furthermore, a color of ink discharged by the printing head 18 is not limited to the color described above. Of course, a flat platen or the like that supports the printing medium 30 for receiving ink discharged from the printing head 18 from below may be provided between the front driving roller 23 and the rear driving roller 24.

A reference sign D1 indicates the first direction. In the example in FIG. 2, the transport direction Df and the first direction D1 are parallel between the front driving roller 23 and the rear driving roller 24. As illustrated in the bottom stage in FIG. 2, the second direction D2 intersects the first direction D1. As described above, when the first direction D1 is referred to as the main scanning direction, the second direction D2 is referred to as a sub scanning direction. The first direction D1 and the second direction D2 may be understood to be orthogonal. In the example in FIG. 2, a guide rail 26 that is elongated in the first direction D1 is provided above the printing medium 30 between the front driving roller 23 and the rear driving roller 24, and the carriage 17 is movable along the guide rail 26. Of course, a member supporting the carriage 17 to stabilize posture of the carriage 17 is not limited to the guide rail 26.

Also, the carriage 17 can move along the second direction D2. For example, a mechanism such as another guide rail for reciprocating a unit including the carriage 17 and the guide rail 26 along the second direction D2 is provided. Each move of the carriage 17 in the first direction D1 and the second direction D2 in this way is controlled by the control unit 11. In other words, the carriage 17 on which the printing head 18 is mounted can move two-dimensionally with respect to a surface of the printing medium 30.

Movement of the carriage 17 along the second direction D2 corresponds to relative movement of the carriage 17 and the printing medium 30 in the second direction D2. An operation of the printing head 18 discharging ink as the carriage 17 moves along the first direction D1 is referred to as "main scanning". The main scanning is also referred to as a "pass". Further, the relative movement of the carriage 17 and the printing medium 30 in the second direction D2 is referred to as "sub scanning".

In the example in FIG. 2, the colorimetric unit 19 is provided at a position downstream of the carriage 17. The colorimetric unit 19 performs colorimetry for the printing medium 30 on which printing is performed by the printing head 18. However, it is sufficient that the colorimetric unit 19 is capable of performing colorimetry for the printing medium 30 after printing, and may be mounted on the carriage 17, for example.

2. Description of Specific Color DB

Figure 3:
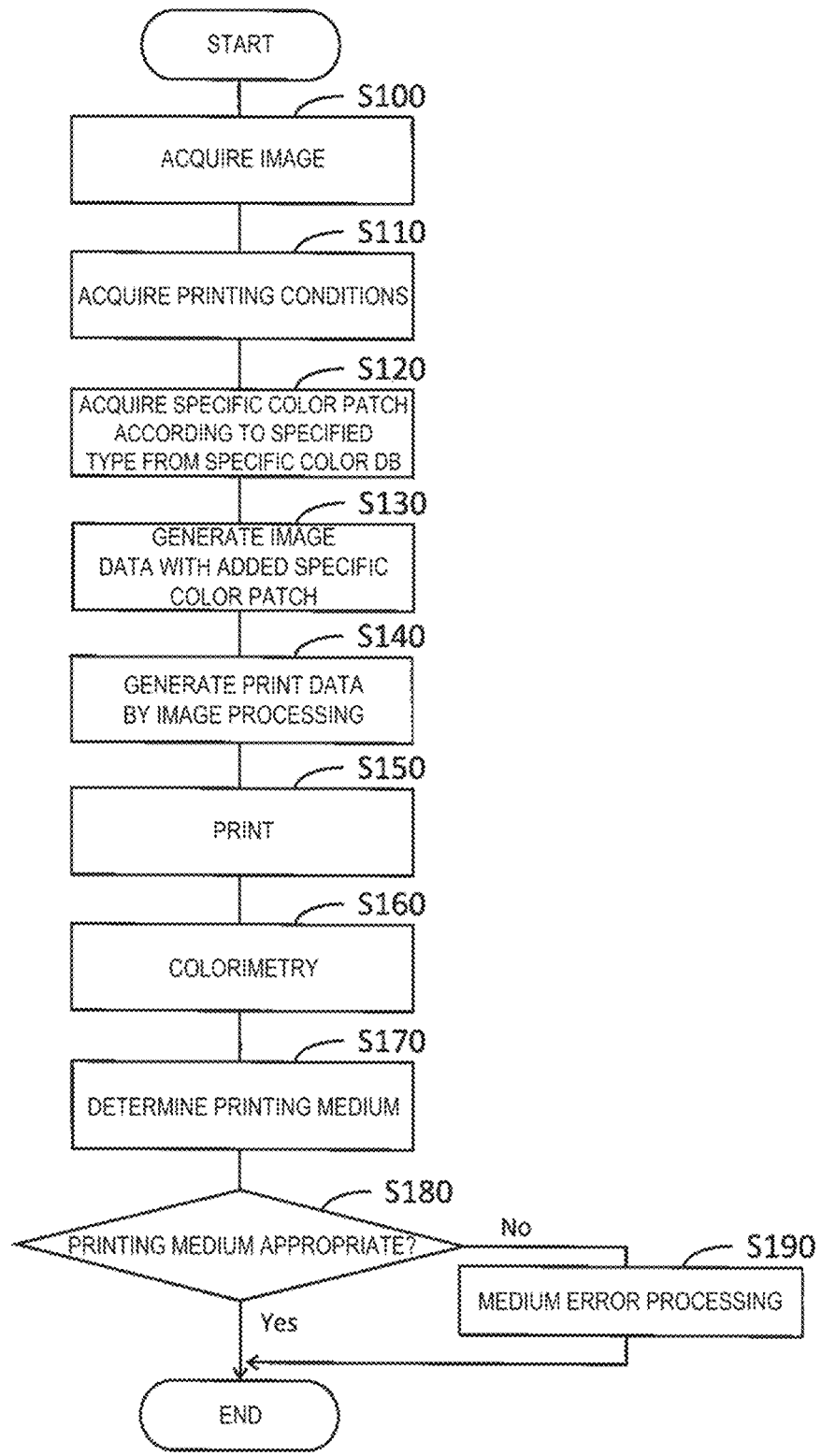
FIG. 3 is a flowchart illustrating printing colorimetric processing.

FIG. 3 illustrates printing colorimetric processing according to the present exemplary embodiment by a flowchart. The printing colorimetric processing includes the printing medium determination method. The printing colorimetric processing is realized by the control unit 11 performing processing according to the program 12. Determination of a printing medium in the present exemplary embodiment is processing for determining whether a type of the printing medium 30 used by the printing unit 21 for performing printing is a type of a printing medium specified by a user or not. There are various types of a printing medium, for example, such as standard paper, gloss paper, and types other than a sheet. The type of the printing medium specified by the user is referred to as a "specified type". The specified type is also referred to as a predetermined type.

In step S120 of the printing colorimetric processing, the control unit 11 acquires a specific color patch according to a specified type from a specific color DB. DB stands for database. A specific color patch to be acquired in step S120 is registered with the specific color DB per type of a printing medium. The specific color patch according to the specified type is a patch that is printed on the printing medium 30 and for which colorimetry is performed, in order to determine the printing medium (step S170).

Here, the specific color DB will be described before describing the printing colorimetric processing in FIG. 3.

Figure 4:
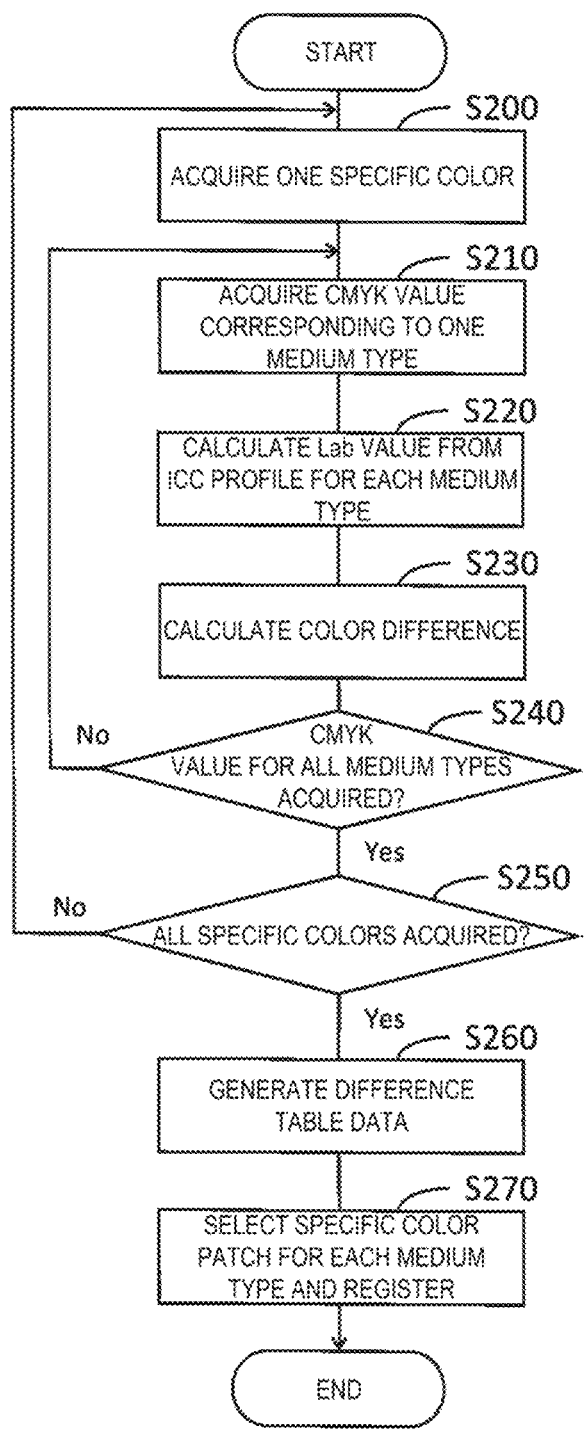
FIG. 4 is a flowchart illustrating specific color DB registration processing.

FIG. 4 illustrates, by a flowchart, specific color DB registration processing that the control unit 11 performs according to the program 12. The specific color DB registration processing includes a patch selection method.

In step S200, the patch selection processing unit 12a acquires one specific color from a specific color DB 40. The specific color DB 40 is stored in the storage unit 20 in advance.

FIG. 5A illustrates an example of the specific color DB 40. The specific color DB 40 defines a correspondence relationship between a color of a specific color patch or a specific color, and a CMYK value for reproducing the specific color on a printing medium, that is a CMYK value per type of the printing medium, for a plurality of the specific color patches P1, P2, P3, P4, and P5. The specific color patches P1, P2, P3, P4, and P5 are color patches of different specific colors from one another.

In specific color DB 40, the specific color is defined in a predetermined color space. Specifically, the specific color is defined by an L*a*b* value according to an L*a*b* color space. The description of "*" is omitted as appropriate. For example, the specific color patch P1 has (L, a, b)=(56, 66, 36) and is red or a color that is close to red. Further, the specific color patch P2 has (L, a, b)=(47, −2, −43) and is blue or a color that is close to blue. Such an Lab value can be said to be a "reference value" of a color of the specific color patch. However, a color space defining a reference value may be other color spaces such as an L*C*h* color space and an XYZ color space.

In the specific color DB 40, a CMYK value for reproducing a specific color on a printing medium is defined for each of a plurality of medium types α, β, and γ of the printing medium. The CMYK value is a combination of gray scale values each indicating an ink amount for each of CMYK. The gray scale value is expressed, for example, in a 256 gray scale range from 0 to 255. A CMYK value corresponds to "color material data". For example, a CMYK value required to reproduce the Lab value of the specific color patch P1 on a printing medium of the medium type α has (C, M, Y, K)=(1, 84, 71, 0). Further, a CMYK value required to reproduce the Lab value of the specific color patch P2 on a printing medium of the medium type β has (C, M, Y, K)=(95, 61, 6, 0).

The CMYK value defined by the specific color DB 40 can be calculated using a so-called ICC profile. In other words, an ICC profile 50α for the medium type α is prepared in advance, in which a conversion relationship between a CMYK value and an Lab value as a colorimetric value of a patch reproduced on the printing medium of the medium type α by the CMYK value is defined. Similarly, an ICC profile 50β for the medium type β that defines a conversion relationship between a CMYK value and a colorimetric value (Lab value) of a patch reproduced on a printing medium of the medium type β by the CMYK value, and an ICC profile 50γ for the medium type γ that defines a conversion relationship between a CMYK value and a colorimetric value (Lab value) reproduced on a printing medium of the medium type γ by the CMYK value are prepared in advance. The CMYK value defined by the specific color DB 40 per specific color patch and per medium type is data calculated using the Lab value of the specific color patch and such an ICC profile. The specific color DB 40 having the Lab value as the reference value and the CMYK value per specific color patch in this manner can be said to define patch data that defines the color of the color patch per color patch.

In step S200, the patch selection processing unit 12a acquires one specific color from the specific color DB 40, for example, the Lab value of the specific color patch P1.

In step S210, the patch selection processing unit 12a acquires, from the specific color DB 40, a CMYK value corresponding to the specific color acquired in step S200, that is a CMYK value corresponding to one medium type. For example, a CMYK value corresponding to the specific color patch P1 and the medium type α is acquired.

The medium type to which the CMYK value obtained in step S210 corresponds is referred to as a "reference type" for convenience.

Such steps S200 and S210 correspond to an acquisition step for acquiring the reference value indicating the color of the color patch in the predetermined color space, and the color material data for reproducing the reference value on a printing medium of the reference type.

In step S220, the patch selection processing unit 12a calculates an Lab value per medium type using the CMYK value acquired in step S210, and the ICC profile per medium type.

In step S230, the patch selection processing unit 12a compares the Lab value per medium type calculated in step S220 with the specific color acquired in step S200, to calculate a color difference per medium type.

Such steps S220 and S230 include a difference calculating step for calculating a difference between each colorimetric value obtained when the color material data acquired in the acquisition step is used to perform printing on each printing medium of a comparison type different from the reference type, and the reference value acquired in the acquisition step.

Figure 6:
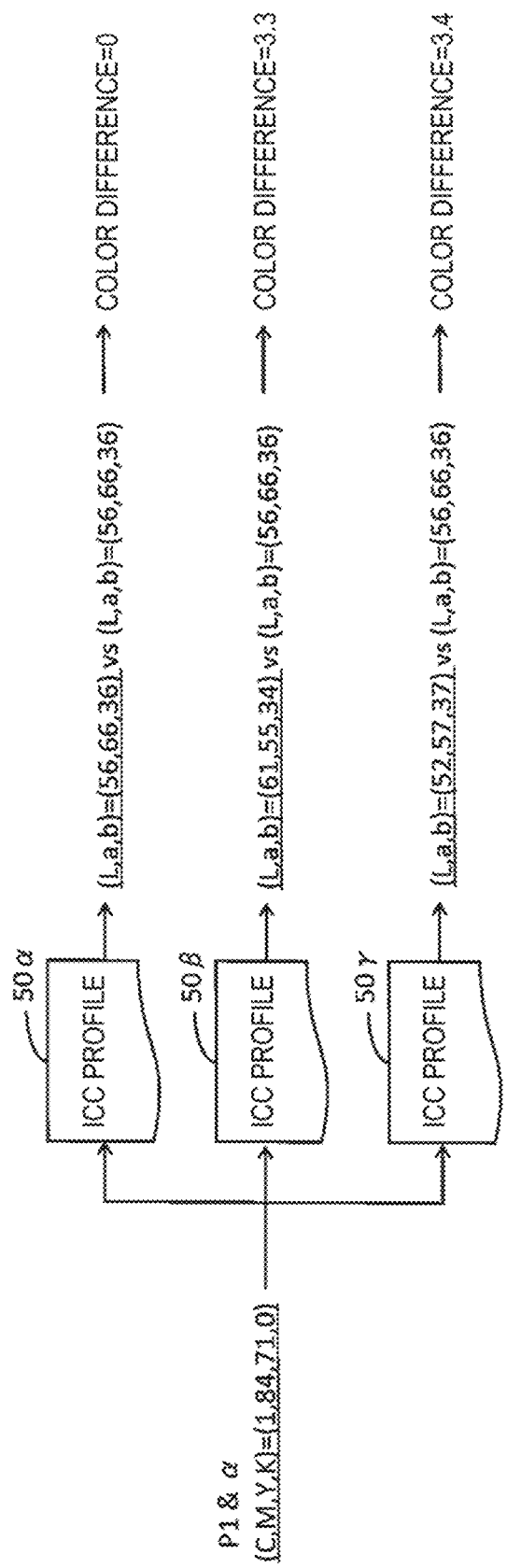
FIG. 6 is a diagram for explaining processes in steps S200 to S230 by a specific example.

FIG. 6 is a diagram explaining the processes in steps S200 to S230 by a specific example. In the example in FIG. 6, it is assumed that the specific color of the specific color patch P1 is acquired in step S200, and the CMYK value, (C, M, Y, K)=(1, 84, 71, 0) for reproducing the specific color patch P1 on the printing medium of the medium type a is acquired in step S210. In other words, in the example in FIG. 6, the medium type α is the reference type. In step S220, the patch selection processing unit 12a inputs this (C, M, Y, K)=(1, 84, 71, 0) into each of the ICC profile 50α, the ICC profile 50β, and the ICC profile 50γ, and calculates an Lab value as a conversion result by each of the ICC profiles 50α, 50β, and 50γ. The ICC profiles 50α, 50β, and 50γ are stored in the storage unit 20.

In the example in FIG. 6, the patch selection processing unit 12a calculates (L, a, b)=(56, 66, 36) as the conversion result by the ICC profile 50a in step S220, calculates (L, a, b)=(61, 55, 34) as the conversion result by the ICC profile 50β, and calculates (L, a, b)=(52, 57, 37) as the conversion result by the ICC profile 50γ. In step S230, the patch selection processing unit 12a compares the Lab values as these conversion results with the specific color of the specific color patch P1 to calculate the color differences.

Note that, the Lab value obtained by converting the CMYK value for reproducing the specific color patch P1 on the printing medium of the medium type α by the ICC profile 50a is the specific color of the specific color patch P1, so the color difference for this is 0, as illustrated in FIG. 6.

According to the example in FIG. 6, a color difference between the Lab value obtained by converting the CMYK value for reproducing the specific color patch P1 by the ICC profile 50β on the printing medium of the medium type α, and the specific color of the specific color patch P1 is 3.3. This means that a patch having the color difference of 3.3 from an original color of the specific color patch P1 is printed, when the printing is mistakenly performed on a printing medium of the medium type β by the CMYK value for reproducing the specific color patch P1 on the printing medium of the medium type α.

According to the example in FIG. 6, a color difference between the Lab value obtained by converting the CMYK value for reproducing the specific color patch P1 by the ICC profile 50γ on the printing medium of the medium type α, and the specific color of the specific color patch P1 is 3.4. This means that a patch having the color difference of 3.4 from the original color of the specific color patch P1 is printed, when printing is mistakenly performed on a printing medium of the medium type γ by the CMYK value for reproducing the specific color patch P1 on the printing medium of the medium type α.

In step S240, the patch selection processing unit 12a determines whether the CMYK values corresponding to the specific color acquired in step S200, that are the CMYK values for the respective medium types are all acquired in step S210 from the specific color DB 40. Then, when there is unacquired CMYK value remaining, the processing returns to step S210 from the determination of "No" in step S240, a CMYK value corresponding to one medium type other than the previous types is acquired, and steps S220 and S230 are performed. On the other hand, when the CMYK values corresponding to the specific color acquired in step S200, that are the CMYK values for the respective medium types are all acquired in step S210 from the specific color DB 40, the processing proceeds to step S250 from the determination of "Yes" in step S240.

In step S250, the patch selection processing unit 12a determines whether the specific colors of all of the specific color patches are all acquired from the specific color DB 40 in step S200. Then, when an unacquired specific color remains, the processing returns to step S200 from the determination of "No" in step S250, one specific color other than the previous specific colors is acquired, and step S210 and later are performed. On the other hand, when the specific colors of all of the specific color patches are all acquired from the specific color DB 40 in step S200, the processing proceeds to step S260 from the determination of "Yes" in step S250.

As a result of the determination in each of steps S240 and S250, the acquisition step (steps S200, S210) and the difference calculating step (steps S220, S230) are repeatedly performed while the combination of the color patch and the reference type is changed.

At the time when "Yes" is determined in step S250, the patch selection processing unit 12*a* ends calculating the color difference per medium type for all the CMYK values defined in the specific color DB 40. In step S260, the patch selection processing unit 12*a* generates difference table data 60 representing the color difference per medium type calculated in step S230 in a table format, and causes the storage unit 20 to store the difference table data 60.

FIG. 7 illustrates an example of the difference table data 60. As illustrated in FIG. 7, the difference table data 60 is constituted by difference tables 60P1, 60P2, 60P3, 60P4, and 60P5 that summarize the color differences for the respective specific color patches P1, P2, P3, P4, and P5. The difference table in FIG. 7 represents a color difference between an Lab value when a corresponding specific color patch is printed per reference type and an Lab value when printing is performed per comparison type. For example, the difference table 60P1 corresponding to the specific color patch P1 represents a color difference between an Lab value when the specific color patch P1 is printed per reference type and an Lab value when printing is performed per comparison type. Note that, "Lab value when printing is performed" refers to a colorimetric value that is to be obtained by performing printing and colorimetry, and in step S220, such a colorimetric value is calculated using the ICC profile. The comparison type is the medium type to which each Lab value calculated in step S220 corresponds. It may be understood that the comparison type includes the reference type or that the comparison type does not include the reference type. In the difference table 60P1, for example, a color difference=3.3 is defined for a relationship between the reference type=the medium type α and the comparison type=the medium type β, a color difference=3.4 is defined for a relationship between the reference type=the medium type α and the comparison type=the medium type γ, and these color differences are the color differences illustrated in FIG. 6.

FIG. 8 illustrates the difference table data 60 by another form of expression. In FIG. 8, the difference table data 60 is constituted by difference tables 60α, 60β, and 60γ, in which the color differences are summarized per reference type (medium type α, β, γ). The difference table data 60 illustrated in FIG. 7 and the difference table data 60 illustrated in FIG. 8 differ only in form of expression and have the same contents. For example, the difference table 60α is a table obtained by extracting the color difference corresponding to the reference type=the medium type α, from each of the difference tables 60P1, 60P2, 60P3, 60P4, and 60P5. In the present exemplary embodiment, the difference table data 60 in both the forms of expression illustrated in FIGS. 7 and 8 is not necessarily required, and it is sufficient that one or the other is present. For ease of understanding, the difference table data 60 is illustrated in each of FIGS. 7 and 8.

In step S270, the patch selection processing unit 12*a* references the difference table data 60 to select a specific color patch for each of the medium types α, β, and γ, and registers a selected result with the specific color DB 40. Step S270 corresponds to a selection step for selecting a color patch for each type of the printing medium as the reference type for discriminating the printing medium as the reference type from the printing medium of the comparison type, based on the difference calculated as the results in steps S200 to S250. The patch selection processing unit 12*a* selects, for example, a patch having a greater average color difference. An average color difference referred to here is an average value of color differences per comparison type with respect to a reference type. For example, for the specific color patch P1 in the difference table 60α, an average value of the color difference 3.3 between the reference type α and the comparison type β, and the color difference 3.4 between the reference type α and the comparison type γ is 3.35. According to the difference table 60*a* in FIG. 8, it is the specific color patch P1 that has the greatest average color difference from the comparison types. In other words, a distinctive color difference arises between the Lab value obtained when the specific color patch P1 is printed on the medium type β or the medium type γ by mistake with the CMYK value for performing printing on the medium type α, and the specific color of the specific color patch P1. Thus, the patch selection processing unit 12*a* selects the specific color patch P1 from among the specific color patches P1, P2, P3, P4, and P5 for the medium type α.

Additionally, according to the difference table 60β, it is the specific color patch P5 that has the greatest average color difference from the comparison types. In other words, a distinctive color difference arises between the Lab value obtained when the specific color patch P5 is printed on the medium type α or the medium type γ by mistake with the CMYK value for performing printing on the medium type β, and the specific color of the specific color patch P5. Thus, the patch selection processing unit 12*a* selects the specific color patch P5 for the medium type β. Similarly, according to the difference table 60γ, it is the specific color patch P1 that has the greatest average color difference from the comparison types. In other words, a distinctive color difference arises between the Lab value obtained when the specific color patch P1 is printed on the medium type α or the medium type β by mistake with the CMYK value for performing printing on the medium type γ, and the specific color of the specific color patch P1. Thus, the patch selection processing unit 12*a* selects the specific color patch P1 for the medium type γ.

FIG. 5B describes the specific color DB 40 after registering such a selection result for the patches per medium type. According to FIG. 5B, it is registered with the specific color DB 40 that the specific color patch P1 is selected for the medium type α. Similarly, according to FIG. 5B, it is registered that the specific color patch P5 is selected for the medium type β, and the specific color patch P1 is selected for the medium type γ.

In the above, the specific color DB registration processing in FIG. 4 is terminated.

3. Printing Colorimetric Processing

Next, the printing colorimetric processing in FIG. 3 will be described assuming that the specific color DB registration processing is performed.

In step S100, the printing controller 12*b* acquires an image to be printed. In other words, the printing controller 12*b* inputs image data representing the image, specified through an operation of the operation receiving unit 14 by a user, from a predetermined storage source. The image data acquired in step S100 is, for example, bitmap data representing a color of each pixel in an RGB value.

In step S110, the printing controller 12*b* acquires printing conditions of the image. The printing conditions are also acquired as information specified through an operation of the operation receiving unit 14 by the user. Alternatively, the printing conditions may be information set in advance in association with the image data acquired in step S100, or the like. The printing conditions are information including a type of a printing medium, a printing medium size for a single printing, the number of passes, a sub scanning amount, and the like. The type of the printing medium in the printing conditions is a specified type. The printing medium size is indicated by a medium width×a medium length. In the example in FIG. 2, the medium length is a length in the first direction D1, and the medium width is a length in the second direction D2. In the present exemplary embodiment, a single printing is also referred to as printing for one frame, and the printing medium size is also referred to as a frame size.

The number of passes is the number of passes required for the printing for one frame. The sub scanning amount is a distance of the sub scanning performed between a pass required for printing for one frame and a pass.

Note that, the order of the steps S100 and S110 need not exactly be as illustrated in FIG. 3, and the steps S100 and S110 may be the processes performed substantially simultaneously, or may be the processes performed in a reverse order from the order illustrated in FIG. 3.

In step S120, the printing controller 12*b* acquires a specific color patch according to a specified type from the specific color DB 40 stored in the storage unit 20. According to the example in FIG. 5B, the printing controller 12*b* acquires information of the specific color patch P1 when the specified type is the medium type α. In addition, it is sufficient that when the specified type is the medium type β, information of the specific color patch P5 is acquired, and when the specified type is the medium type γ, the information of the specific color patch P1 is acquired. Step S120 corresponds to a patch acquisition step for acquiring patch data for one color patch from the storage unit 20.

In step S130, the printing controller 12*b* generates image data to which the specific color patch acquired in step S120 is added. Specifically, the printing controller 12*b* first arranges an image according to the frame size. That is, by arraying the image data acquired in step S100 according to the frame size in the printing conditions acquired in step S110, image data used for printing for one frame is generated. Then, the printing controller 12*b* synthesizes the specific color patch at a predetermined position in the image data of the frame size.

Figure 9:
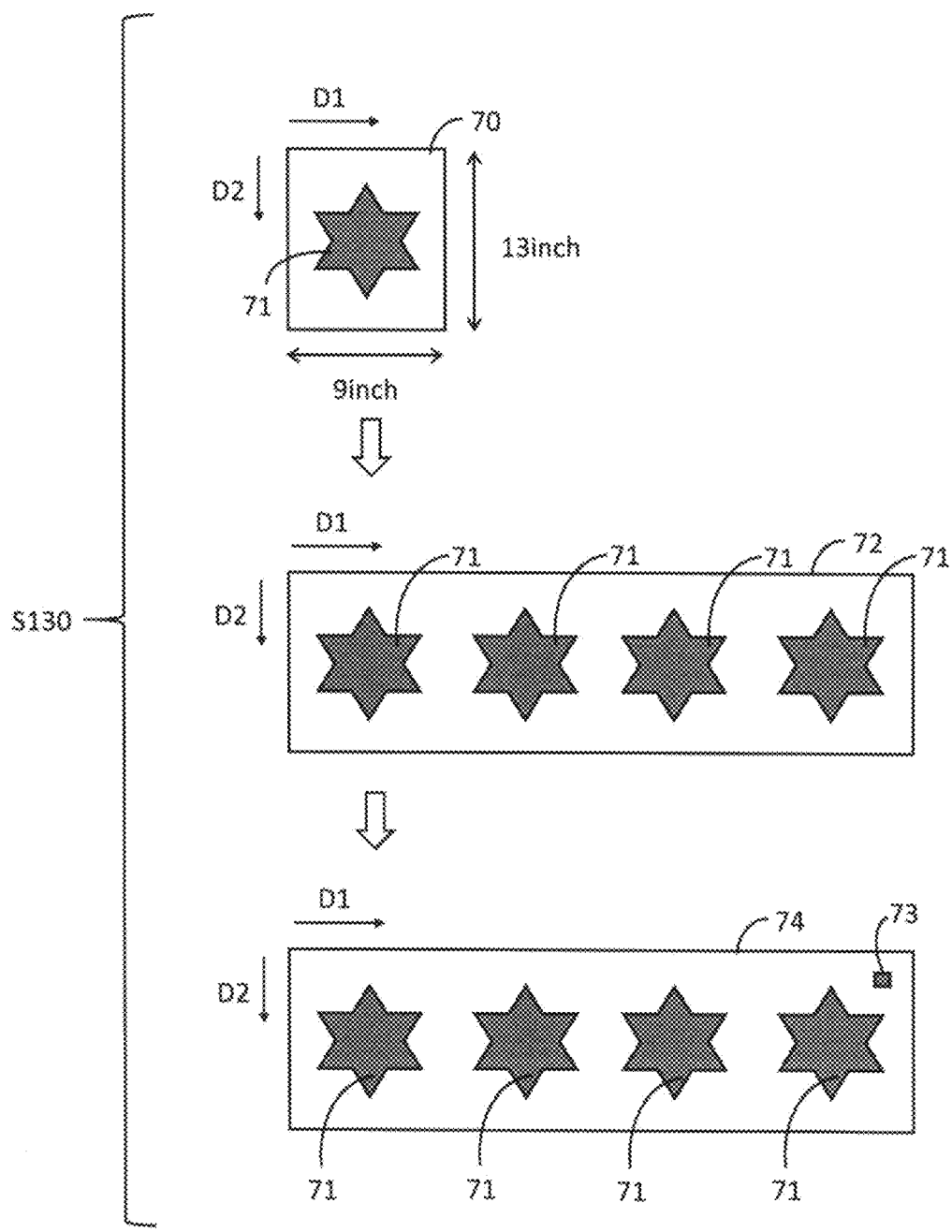
FIG. 9 is a diagram explaining a process in step S130 by a specific example.

FIG. 9 is a diagram explaining the process in step S130 using a specific example. A reference sign 70 in an upper stage in FIG. 9 denotes the image data acquired in step S100. The image data 70 represents a star-shaped image 71 that is painted in a certain color. Contents of the image 71 are determined by the user as desired. In the example in FIG. 9, the image data 70 is image data that is 13 inches in length and 9 inches in width. In FIG. 9, a correspondence relationship between the image data and the directions D1 and D2 is also illustrated.

The contents of the printing conditions acquired in step S110 are various, but here, for the purpose of describing FIG. 9, it is assumed that the frame size=the medium width 13 inches×the medium length 36 inches. In this case, in step S130, the printing controller 12*b* copies the image data 70 and sequentially arranges four images corresponding to the first direction D1, so as to generate image data 72 to be used for printing for one frame, as illustrated in a middle stage in FIG. 9. In step S130, the printing controller 12*b* may expand or contract the image data 70 as necessary.

Furthermore, in step S130, the printing controller 12*b* generates image data 74 as illustrated in a bottom stage in FIG. 9, by synthesizing a specific color patch 73 at a predetermined position in the image data 72. The predetermined position referred to here is, for example, a predetermined position for the colorimetric unit 19 to perform colorimetry for the specific color patch, and is a position as downstream as possible within the image data 72. Further, the printing controller 12*b* synthesizes the specific color patch 73 at a position in the image data 72 that does not overlap with the image 71. Here, assuming that the specified type=medium type α, the specific color patch 73 is the specific color patch P1. In other words, the printing controller 12*b* acquires, from the specific color DB 40, a CMYK value corresponding to the medium type α of the specific color patch P1, and synthesizes the specific color patch 73 as an image region in which pixels having the acquired CMYK value are collected in the image data 72.

In step S140, the printing controller 12*b* generates print data for the printing unit 21 to perform printing, by performing image processing necessary for the image data 74 generated in step S130. The printing controller 12*b* performs color conversion processing on the image data 74, for example. That is, an RGB value of each pixel constituting the image data 74 is converted to a CMYK value with reference to a pre-generated color conversion LUT. LUT is an abbreviation for lookup table. The color conversion LUT is a table defining a correspondence relationship between an RGB value and a CMYK value. Note that, such color conversion processing is not necessary for a region of the image data 74 corresponding to the specific color patch 73.

The printing controller 12*b* further performs halftone processing on the image data 74. The image data 74 is in a state in which each pixel has a CMYK value, by the color conversion processing. By the halftone processing, the image data 74 becomes print data defining ink discharge (dot on) or ink non-discharge (dot off) per pixel and per CMYK. Of course, dot-on information in the print data may be information defining which of a plurality of dot sizes, such as a large dot, a medium dot, and a small dot, is discharged, for example. The halftone processing can be performed by, for example, a dithering method or an error diffusion method.

In step S150, the printing controller 12*b* causes the printing unit 21 to perform printing for one frame based on the print data and the printing conditions. In other words, the printing controller 12*b* controls movement of the carriage 17 in the first direction D1 and the second direction D2 in accordance with the number of passes and the sub scanning amount in the printing conditions, and causes the printing head 18 to perform ink discharge according to the print data. In each pass, the printing head 18 does or does not discharge ink of each of CMYK colors from each nozzle based on the dot-on/dot-off information that is defined by the print data per pixel. As a result, the image 71 and the specific color patch 73 represented by the image data 74 are printed in a range for one frame size in the printing medium 30. Step S150 corresponds to a printing step that causes the printing unit 21 to perform printing of the color patch on the printing medium 30. During a period of the printing for one frame according to step S150, the transport unit 16 does not transport the printing medium 30. In other words, in step S150, the pass and the sub scanning are performed on the printing medium 30 in a stationary state.

In step S160, the colorimetric control unit 12*c* controls the colorimetric unit 19 to perform colorimetry for the specific color patch printed on the printing medium 30. According to the example in FIG. 9, the colorimetric unit 19 performs colorimetry for the specific color patch 73 printed on the printing medium 30, and outputs a colorimetric value obtained by the colorimetry to the control unit 11. Of course, the transport unit 16 transports the printing medium 30 by a distance necessary to cause the colorimetric unit 19 to perform colorimetry for the specific color patch 73, after step S150 and before step S160.

In step S170, the medium determination unit 12d determines whether a type of the printing medium 30 on which the printing unit 21 prints the specific color patch is a specified type, based on the colorimetric value obtained by the colorimetry for the specific color patch in step S160. Steps S170 and S180 correspond to a determination step. In this case, the medium determination unit 12d calculates a color difference between the colorimetric value of the specific color patch and the specific color corresponding to the specified type. Assuming the specified type=the medium type α as described above, in step S120, the information of the specific color patch P1 is acquired from the specific color DB 40, and thus it is sufficient that the medium determination unit 12d calculates the color difference by comparing the Lab value (56, 66, 36) indicating the color of the specific color patch P1 with the colorimetric value of the specific color patch obtained in step S160.

Then, the medium determination unit 12d compares the color difference calculated in this way to a predetermined threshold value for the color difference, and determines whether the color difference<the threshold value or the color difference≥the threshold value. The threshold value for the color difference used in the determination in step S170 is appropriately approximately 2.0, for example, with reference to FIG. 8. For this threshold value, the user may arbitrarily set.

In step S180, the medium determination unit 12d causes the processing to branch in accordance with the determination result of step S170. When the color difference<threshold value, the medium determination unit 12d determines that the type of the printing medium 30 on which the printing unit 21 printed the specific color patch is the specified type, that is, determines that the printing medium 30 is appropriate (step S180: Yes) and terminates the printing colorimetric processing in FIG. 3. On the other hand, when the color difference≥the threshold value, the medium determination unit 12d determines that the type of the printing medium 30 is not the specified type, that is, determines that the printing medium 30 is not appropriate (step S180: No), and the processing proceeds to step S190.

Although not illustrated in FIG. 3, after the printing colorimetric processing is terminated according to the determination of Yes in step S180, it is sufficient that the control unit 11 continues to control the printing unit 21 for performing next printing for one frame.

In step S190, the control unit 11 performs medium error processing to terminate the flowchart in FIG. 3. The medium error processing is, for example, processing for stopping operations involved in printing. In other words, the printing medium 30 of a type different from a type intended by the user is currently set and used in the printing unit 21, and thus the control unit 11 stops driving the printing unit 21 and terminates the flowchart in FIG. 3. As a result, the printing medium 30 and ink can be prevented from being further wastefully consumed. Additionally, as one type of the medium error processing, the control unit 11 may cause the display unit 13 to display a warning screen notifying the user that the printing medium 30 is not appropriate.

In the example in FIG. 9, the image 71 and the specific color patch 73 in the image data 74 are represented by the same color. In other words, in the printing colorimetric processing in FIG. 3, the image acquired in step S100 and the specific color patch added in step S130 may be printed with the same color. In this case, it is sufficient that the printing controller 12b generates, in step S130, image data 74 including the image 71 representing the color of each pixel with the same CMYK value as the CMYK value of the specific color patch acquired from the specific color DB 40 in accordance with the specified type in step S120, and the specific color patch 73. By printing the image 71 and the specific color patch 73 in the same color on the printing medium 30 in this manner, the control unit 11 that obtains the colorimetric value of the patch 73 in the colorimetry in step S160 can not only perform the determination in steps S170 and S180, but also determine whether the color of the image 71 in the printing result is appropriate. The control unit 11, based on the colorimetric value of the specific color patch 73, can determine whether the color of the image 71 in the printing result is appropriate or not, to notify the user of the determination result, and perform color calibration or the like of the image 71 as necessary.

4. Other Examples of Patch Printing

Figure 10A:
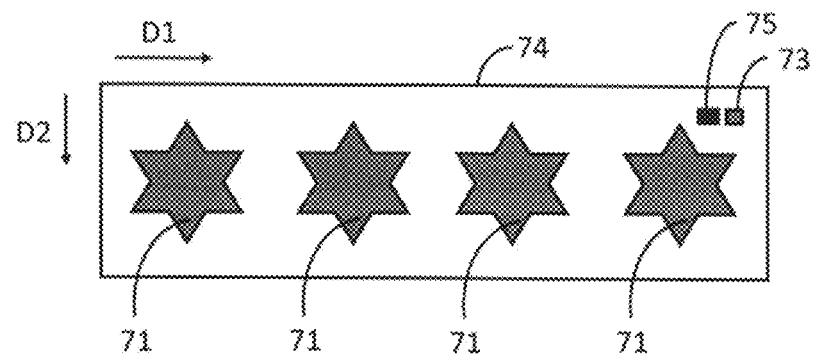
FIG. 10A and FIG. 10B are diagrams each illustrate an example of image data generated in step S130.

FIG. 10A illustrates the image data 74 generated in step S130, which is different from the example illustrated in FIG. 9. The image data 74 illustrated in FIG. 10A includes a plurality of specific color patches 73 and 75. In other words, the printing controller 12b may print a plurality of specific color patches along with the image 71 on the printing medium 30.

In describing FIG. 10A, it is assumed that the specified type=the medium type β. Furthermore, in the specific color DB 40 described above, it is assumed that the specific color patch P5 is not defined, and the specific color patches P1 to P4 are defined. Therefore, also in the difference table data 60 illustrated in FIG. 8, there is no color difference information corresponding to the specific color patch P5 in each of the difference tables 60α, 60β, and 60γ. In such a case, in step S270 in the specific color DB registration processing (FIG. 4), the patch selection processing unit 12a selects the specific color patch P1 and the specific color patch P4 for the medium type β to register the patches with the specific color DB 40. In other words, according to the difference table 60β, when the specific color patch P5 is not present, there is no specific color patch that is sufficiently large in color difference from any of the medium types α and γ. Being sufficiently large in color difference means that the color difference is equal to or greater than the threshold value used in the determination in step S170. Thus, the patch selection processing unit 12a selects the specific color patch P1 as a specific color patch for determining the medium type β as the medium type α, and selects the specific color patch P4 as a specific color patch for determining the medium type β as the medium type γ.

In such a situation, when the specified type=medium type β, in step S120 in FIG. 3, the printing controller 12b acquires information of the specific color patch P1 and the specific color patch P4 from the specific color DB 40. Then, in step S130, the printing controller 12b generates the image data 74 to which the specific color patch 73 in which each pixel has the CMYK value corresponding to the medium type β of the specific color patch P1, and the specific color patch 75 in which each pixel has the CMYK value corresponding to the medium type β of the specific color patch P4 are added. As a result, the specific color patch 73 and the specific color patch 75 are printed on the printing medium 30 along with the image 71, and the medium determination unit 12d performs the determination in the steps S170 and S180 using the colorimetric value of the color specific color patch 73 and a colorimetric value of the specific color patch 75. In this case, the medium determination unit 12d compares each of a color difference between the colorimetric value of the specific color patch 73 and the Lab value of the specific color patch P1 defined in the specific color DB 40, and a color difference between the colorimetric value of the specific color patch 75 and the Lab value of the specific color patch P4 defined in the specific color DB 40, with the threshold value, and it is sufficient to determine "No" in step S180 when the color difference of either one is equal to or greater than the threshold value.

Figure 10B:
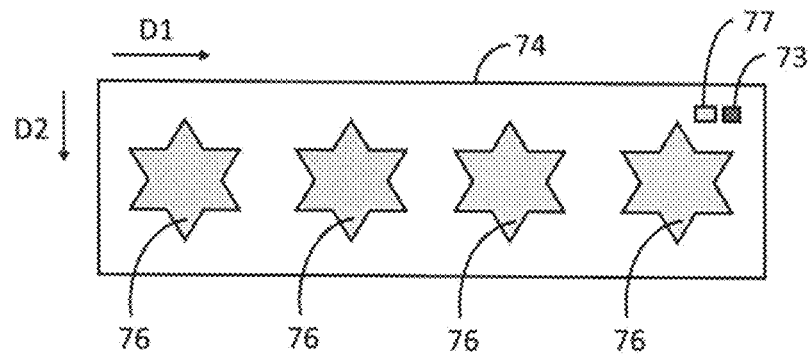

FIG. 10B illustrates the image data 74 generated in step S130, which is an example different from the examples illustrated in FIGS. 9 and 10A. Of course, a color of the image to be printed on the printing medium 30 may differ from a color of a specific color patch to be printed with this image. In the example in FIG. 10B, an image 76 included in the image data 74 and the specific color patch 73 are different in color. In such a case, the printing controller 12b may include an evaluation patch 77 in the same color as the image 76 along with the image 76 and the specific color patch 73 in the image data 74. As a result, the specific color patch 73 and the evaluation patch 77 are printed on the printing medium 30 along with the image 76, and the medium determination unit 12d uses the colorimetric value of the specific color patch 73 to perform the determination in steps S170 and S180. Additionally, it is sufficient that the control unit 11 determines whether the color of the image 76 in the printing result is appropriate, based on colorimetric value of the evaluation patch 77.

5. Summary

As described above, according to the present exemplary embodiment, the printing apparatus 10 includes the printing unit 21 applying a color material to a printing medium to perform printing, the colorimetric unit 19 performing colorimetry, the storage unit 20 storing patch data defining a color of a color patch for a plurality of the color patches, and the control unit 11. The control unit 11 uses patch data for one color patch of the plurality of color patches stored in the storage unit 20, to cause the printing unit 21 to print the color patch on the printing medium, and based on colorimetric value obtained by the colorimetric unit 19 by performing colorimetry for the color patch printed by the printing unit 21, determines whether a type of the printing medium on which the printing unit 21 printed the color patch is a predetermined type or not.

According to the configuration, it is possible to determine whether the type of the printing medium used by the printing unit 21 is a specified type, using the colorimetric unit 19 used in the colorimetry of images or patches, without the need for a dedicated medium sensor for detecting a paper type. As a result, a cost can be kept down and determination of a printing medium can be performed. Additionally, a colorimetric value of a color patch for which the colorimetric unit 19 performs colorimetry can be used not only to determine a printing medium, but also to evaluate and determine a color of a print result.

In addition, according to the present exemplary embodiment, patch data stored in the storage unit 20 includes a reference value indicating a color of a color patch in a predetermined color space, and color material data for each type of the printing medium, the color material data defining an amount of a color material for reproducing the reference value on a printing medium.

According to the configuration, the control unit 11 can use the color material data for reproducing the reference value of the one color patch stored in the storage unit 20 to cause printing unit 21 to print the color patch on the printing medium, and determine whether the specified type or not based on a colorimetric value of the color patch and the reference value.

In addition, according to the present exemplary embodiment, the control unit 11 uses color material data corresponding to a predetermined type in patch data of the one color patch to cause the printing unit 21 to print the color patch, and performs the determination in accordance with a difference between the colorimetric value and reference value of the patch data of the one color patch.

According to the configuration, by evaluating the difference between the colorimetric value and the reference value that are to theoretically match when the printing unit 21 uses the printing medium of the specified type, it is possible to accurately determine whether the specified type or not.

In addition, according to the present exemplary embodiment, the storage unit 20 stores the difference table data 60 that represents, for each of the plurality of color patches, a difference between a colorimetric value obtained when color material data for reproducing the reference value on the printing medium of the predetermined type is used to perform printing on each printing medium of a different type, and the reference value. Then, the control unit 11 selects the one color patch from among the plurality of color patches, with reference to the difference table data 60.

According to the configuration, the control unit 11 can select, from among the plurality of color patches, a color patch that is optimal for determining whether the specified type or not.

Further, in addition to the printing apparatus 10, the present exemplary embodiment also discloses disclosure of each category such as a method or a program. The printing medium determination method includes the patch acquisition step for acquiring patch data of one color patch from the storage unit 20 storing patch data defining a color of a color patch for a plurality of the color patches, the printing step for using the patch data of the one color patch to cause the printing unit 21, configured to apply a color material to a printing medium for performing printing, to print the color patch on the printing medium, and the determination step for determining whether a type of the printing medium on which the printing unit 21 printed the color patch is a predetermined type, based on a colorimetric value obtained by the colorimetric unit 19 by performing colorimetry for the color patch that the printing unit 21 prints.

In addition, according to the present exemplary embodiment, a patch selection method includes an acquisition step for acquiring a reference value indicating a color of a color patch in a predetermined color space, and color material data that defines an amount of color material for reproducing the reference value on a printing medium of a reference type, and a difference calculating step for calculating a difference between each colorimetric value obtained when the color material data is used to perform printing on each printing medium of a comparison type different from the reference type and the reference value. Then, the acquisition step and the difference calculating step are repeatedly performed with a combination of the color patch and the reference type changed. Further, a selection step is included for, after the acquisition step and the difference calculating step are repeatedly performed, selecting, based on the calculated difference, a color patch for each type of a printing medium as the reference type for discriminating the printing medium as the reference type from a printing medium of the comparison type per.

According to the patch selection method, an optimal color patch can be selected for determining a printing medium of a different type per type of a printing medium. Therefore, by using the color patch selected in this manner, it is possible to accurately determine the printing medium.

6. Modified Examples

Modification examples included in the present exemplary embodiment will be further described.

First Modified Example

The control unit 11 may perform a predetermined warning to a user, when a difference between a colorimetric value obtained when color material data corresponding to a predetermined type in patch data of the one color patch is used to perform printing on a printing medium of a different type and a reference value of the patch data of the one color patch is within a predetermined difference.

According to the examples of the difference table data 60 illustrated in FIGS. 7 and 8, a specific color patch having color differences from the comparison types averagely exceeding 3.0 can be selected for each of the medium types α, β, and γ. However, depending on the result until step S260 in the specific color DB registration processing in FIG. 4, it is not necessarily possible to select a specific color patch that is sufficiently large in color difference from the comparison type for each of the medium types α, β, and γ. For example, in reference to the medium type β, it is assumed that an average of color differences from the respective medium types α and γ, as the comparison types, is less than a predetermined difference "2.0" in all specific color patches. Even in such a case, the control unit 11 needs to select and register a specific color patch having an average color difference from the comparison types, which is as large as possible, for the medium type β. It is assumed that, in step S270, the control unit 11, in reference to the medium type β, selects the specific color patch P3 having "1.8" as an average of color differences from the respective medium types α and γ, as the comparison types, for example.

In such a case, in the printing colorimetric processing in FIG. 3, if the specified type=the medium type β, the control unit 11 gives a predetermined warning to the user when information of the specific color patch P3 is acquired from the specific color DB 40 in accordance with the specified type in step S120. The warning referred to here is a warning that determination accuracy of whether the specified type or not by the specific color patch P3 printed on the printing medium 30 in response to the specified type being the medium type β is low. In addition, along with such a warning, the control unit 11 may stop driving the printing unit 21 in the same manner as in step S190. The user can indicate to the control unit 11 whether to continue or stop the processes in step S130 and later upon understanding the situation where the determination accuracy by the specific color patch is low. With such a configuration, the user can be protected from disadvantages of continuing the printing without recognizing the situation where the determination accuracy by the specific color patch is low.

Second Modified Example

The CMYK value corresponding to the specific color patch and the medium type in the specific color DB 40 in FIGS. 5A and 5B is the value calculated based on the Lab value of the specific color patch and the ICC profile per medium type. The control unit 11 may adjust such a CMYK value in the specific color DB 40 based on actual printing and colorimetry. That is, the control unit 11 selects color material data to be updated among color material data stored in the storage unit 20, and uses the selected color material data to cause the printing unit 21 to print a color patch on a printing medium to which the selected color material data corresponds, adjusts the selected color material data based on a comparison between a colorimetric value obtained by the colorimetric unit 19 by colorimetry performed by the colorimetric unit on the printed color patch, and a reference value of a color patch to which the selected color material data corresponds, and updates, in the storage unit 20, the selected color material data with the adjusted color material data.

Figure 11:
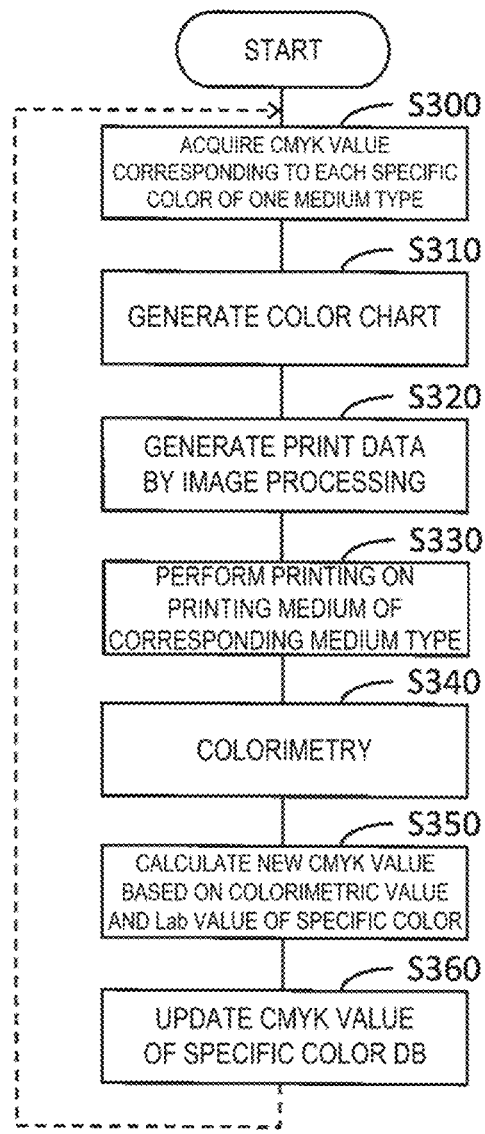
FIG. 11 is a flowchart illustrating color material data adjustment processing.

FIG. 11 illustrates, by a flowchart, color material data adjustment processing for adjusting a CMYK value of the specific color DB 40. Here, by using a scene where a CMYK value corresponding to the medium type α is adjusted as an example, the color material data adjustment processing will be described.

In step S300, the control unit 11 acquires, from the current specific color DB 40, a CMYK value for each of the specific color patches P1, P2, P3, P4, and P5 corresponding to one medium type or the medium type α. Step S300 corresponds to a process for selecting color material data to be updated. When the control unit 11 first performs the color material data adjustment processing for the medium type α, it is sufficient to acquire a CMYK value as a default value in step S300. The default value of the CMYK value is a value calculated based on an Lab value of a specific color patch and an ICC profile per medium type, and is the CMYK value illustrated in the specific color DB 40 in FIGS. 5A and 5B.

In step S310, a color chart is generated based on the CMYK value per specific color patch acquired in step S300. A color chart is image data representing multiple color patches that differ in color from one another. The control unit 11 generates a color patch having the CMYK value for the one specific color patch acquired in step S300, and a plurality of color patches corresponding to a plurality of CMYK values in which a gradation value of at least one ink color of CMYK is changed for the CMYK value. The control unit 11 generates a color chart by repeating the processing for increasing color patches subtly different in color from the CMYK value of one specific color patch per specific color patch.

In step S320, the control unit 11 performs necessary image processing on the color chart generated in step S310 to generate print data for printing the color chart.

In step S330, the control unit 11 causes the printing unit 21 to print the color chart on a printing medium of a corresponding medium type, based on the print data generated in step S320. The corresponding medium type is, of course, the medium type α in this scene. When the printing apparatus 10 is caused to perform the color material data adjustment processing associated with the medium type α, the user sets the printing medium 30 of the medium type α in the printing unit 21 in advance.

In step S340, the control unit 11 acquires a colorimetric value of each color patch in the color chart, by causing the colorimetric unit 19 to perform colorimetry on the color chart printed on the printing medium 30 of the medium type α in step S330.

In step S350, the control unit 11, based on a comparison between the colorimetric value of each color patch acquired by the colorimetry in step S340 with an Lab value of each specific color patch defined in the specific color DB 40, calculates a new CMYK value corresponding to the Lab value of each specific color patch. Step S350 is a process for adjusting the CMYK value. Various techniques may be employed for Step S350, including known techniques. For example, the control unit 11 may map a colorimetric value of each color patch into an Lab space, and based on a positional relationship between an Lab value of each specific color patch and an Lab value of each color patch, calculate a CMYK value corresponding to the Lab value of each specific color patch with higher accuracy by an interpolating operation or the like. The CMYK value calculated in this manner is a new CMYK value corresponding to the Lab value of the specific color patch.

In step S360, the control unit 11 updates a CMYK value per specific color patch defined in the current specific color DB 40 corresponding to the medium type α with the new CMYK value calculated per specific color patch in step S350. As a result, each CMYK value for reproducing each specific color with higher accuracy on a printing medium of the medium type α is defined in the specific color DB 40.

In the above, the color material data adjustment processing associated with the medium type α is completed once. As illustrated by a dashed line arrow in FIG. 11, the control unit 11 may repeatedly perform the color material data adjustment processing associated with the medium type α. By repeating this, reproduction accuracy of the specific color by the CMYK value defined by the specific color DB 40 can be further enhanced.

FIG. 12 illustrates the specific color DB 40 in which part of information is updated as a result of the color material data adjustment processing associated with the medium type α. Comparing the specific color DB 40 in FIG. 12 with the specific color DB 40 in FIGS. 5A and 5B, the CMYK value for each of the specific color patches P1, P2, P3, P4, and P5 corresponding to the medium type α surrounded by a dashed line frame is updated. Of course, as with the color material data adjustment processing associated with the medium type α, the control unit 11 can perform the color material data adjustment processing associated with the medium type β or the color material data adjustment processing associated with the medium type γ.

Then, the control unit 11 can also perform the specific color DB registration processing in FIG. 4 with reference to the specific color DB 40 in which the CMYK value is updated in this manner. According to the specific color DB registration processing performed with reference to the updated specific color DB 40, the value of the color difference calculated in step S230 varies, compared to the color difference DB registration processing performed with reference to the pre-update specific color DB 40. Thus, the specific color patch selected per medium type in step S270 can also differ from the specific color patch selected in the previous specific color DB registration processing, and as a result, the registration of the specific color patch per medium type in the specific color DB 40 can also be updated.

Third Modified Example

Figure 13:
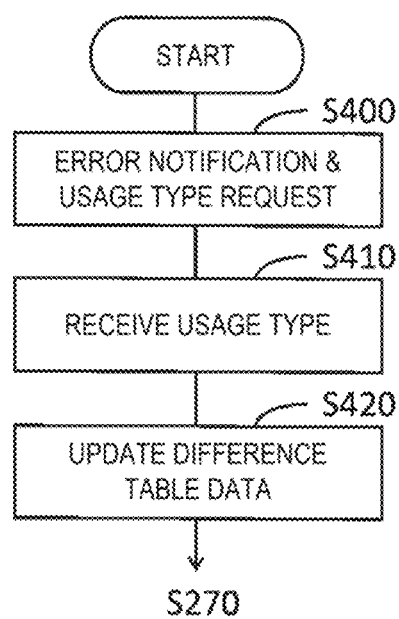
FIG. 13 is a flowchart illustrating difference table data update processing.

In the printing colorimetric processing in FIG. 3, when determining "No" in step S180, the control unit 11 may perform processing illustrated in FIG. 13 as one type of the medium error processing (step S190). FIG. 13 illustrates difference table data update processing by a flowchart.

In step S400, the control unit 11 displays, by a warning screen, an error notification that the printing medium 30 is not appropriate, and displays an input request for a usage type. The usage type is the type of the printing medium currently set in the printing unit 21 and used for the printing in step S150.

In step S410, the control unit 11 receives input of a usage type from the user. The user visually recognizing the warning screen according to step S400 recognizes that the usage type is to be entered because the specified type and the usage type are different. The user checks the printing unit 21 to recognize the usage type, and operates the operation receiving unit 14 to input the usage type.

The control unit 11 that recognizes the usage type by the user input updates the difference table data 60, based on the usage type, and the color difference calculated in the determination in step S170, that is, the color difference between the specific color corresponding to the specified type and the colorimetric value of the specific color patch obtained by the colorimetry in step S160 (step S420). For example, it is assumed that the specified type=the medium type α, and as a result of printing the specific color patch P1 corresponding to the medium type α on the printing medium 30 in step S150, the color difference calculated in step S170 is "2.8", and the control unit 11 determines "No" in step S180. In addition, it is assumed that the usage type received in step S410 is medium type γ. In this case, in step S420, the control unit 11 updates the color difference "3.4" defined in relation to the relationship between the specific color patch P1, the reference type=the medium type α, and the comparison type=the medium type γ in the difference table data 60 illustrated in FIGS. 7 and 8 to the color difference "2.8".

In this way, by updating the difference table data 60 based on the color difference calculated in step S170 from the actual colorimetric result of the specific color patch, and the information of the usage type, accuracy of the difference table data 60 can be improved. After updating the difference table data 60 in step S420, the control unit 11 can perform step S270 in FIG. 4. In other words, with reference to the difference table data 60 with improved accuracy by the updating, the selection of the specific color patch per medium type and the registration with the specific color DB 40 are redone. As a result, the specific color patch suitable for determining the printing medium of a different type can be more accurately selected per medium type.

Another Example

A configuration may be adopted in which the sub scanning, which is relative movement of the carriage 17 and the printing medium 30 in the second direction D2 is realized by transporting the printing medium 30 rather than by moving the carriage 17 along the second direction D2. In other words, the transport direction Df of the printing medium 30 by the transport unit 16 may be a direction parallel to the second direction D2 rather than the direction parallel to the first direction D1 as illustrated in FIG. 2. In this case, it is sufficient that the transport unit 16 transports the printing medium 30 in accordance with the sub scanning amount between a pass and a pass.

The printing medium 30 is not limited to the elongated medium such as roll paper, and may be a single sheet paper or the like that is pre-cut in page units.

What is claimed is:

1. A printing apparatus, comprising:
a printing unit configured to apply a color material to a printing medium to perform printing;
a colorimetric unit configured to perform colorimetry;
a storage unit configured to store patch data defining a color of a color patch for a plurality of the color patches; and
a control unit, wherein
the control unit
uses patch data for one color patch of the plurality of color patches stored in the storage unit, to cause the printing unit to print the color patch on the printing medium, and
determines whether a type of the printing medium on which the printing unit printed the color patch is a predetermined type, based on a colorimetric value obtained by the colorimetry performed by the colorimetric unit on the color patch printed by the printing unit.

2. The printing apparatus according to claim 1, wherein patch data stored in the storage unit includes a reference value indicating a color of a color patch in a predetermined color space, and color material data for each type of the printing medium, the color material data defining an amount of the color material for reproducing the reference value on a printing medium.

3. The printing apparatus according to claim 2, wherein the control unit uses color material data corresponding to the predetermined type of the patch data of the one color patch to cause the printing unit to print the color patch, and performs the determination in accordance with a difference between the colorimetric value and reference value of the patch data of the one color patch.

4. The printing apparatus according to claim 3, wherein the storage unit stores difference table data representing, for each of the plurality of color patches, a difference between each colorimetric value obtained when color material data for reproducing the reference value on the printing medium of the predetermined type is used to perform printing on each printing medium of a different type, and the reference value, and
the control unit selects the one color patch from among the plurality of color patches with reference to the difference table data.

5. The printing apparatus according to claim 4, wherein the control unit gives a predetermined warning to a user, when a difference between a colorimetric value obtained when color material data corresponding to the predetermined type of the patch data of the one color patch is used to perform printing on a printing medium of a different type and the reference value of the patch data of the one color patch is within a predetermined difference.

6. The printing apparatus according to claim 2, wherein the control unit selects color material data to be updated among color material data stored in the storage unit, uses the selected color material data to cause the printing unit to print a color patch on a printing medium to which the selected color material data corresponds, adjusts the selected color material data based on a comparison between a colorimetric value obtained by colorimetry performed by the colorimetric unit on the printed color patch, and the reference value of a color patch to which the selected color material data corresponds, and updates, in the storage unit, the selected color material data with the adjusted color material data.

7. A printing medium determination method, comprising
a patch acquisition step for acquiring patch data of one color patch from a storage unit storing patch data defining a color of a color patch for a plurality of the color patches;
a printing step for using the patch data of the one color patch to cause a printing unit, configured to apply a color material to a printing medium for performing printing, to print the color patch on the printing medium; and
a determination step for determining whether a type of the printing medium on which the printing unit printed the color patch is a predetermined type, based on a colorimetric value obtained by colorimetry performed by a colorimetric unit on the color patch printed by the printing unit.

8. A patch selection method, comprising:
an acquisition step for acquiring a reference value indicating a color of a color patch in a predetermined color space, and color material data defining an amount of a color material for reproducing the reference value on a printing medium of a reference type; and
a difference calculating step for calculating a difference between each colorimetric value obtained when the color material data is used to perform printing on each printing medium of a comparison type different from the reference type and the reference value, wherein
the acquisition step and the differential calculating step are repeatedly performed with a combination of the color patch and the reference type changed, and
the method includes, after the acquisition step and the difference calculating step are repeatedly performed, a selection step for selecting, based on the calculated difference, a color patch for each type of the printing medium as the reference type for discriminating the printing medium as the reference type from the printing medium of the comparison type.

* * * * *